(12) United States Patent
Desyatov et al.

(10) Patent No.: US 7,597,815 B2
(45) Date of Patent: Oct. 6, 2009

(54) PROCESS FOR PRODUCING A POROUS TRACK MEMBRANE

(75) Inventors: Andrey Viktorovich Desyatov, Moscow (RU); Alexei Valerievich Egorov, Voskresensk (RU)

(73) Assignee: Dressel Pte. Ltd., Singapore (SG)

( * ) Notice: Subject to any disclaimer, the term of this patent is extended or adjusted under 35 U.S.C. 154(b) by 0 days.

(21) Appl. No.: 11/189,363

(22) Filed: Jul. 26, 2005

(65) Prior Publication Data

US 2005/0252883 A1    Nov. 17, 2005

(51) Int. Cl.
*B31D 3/00* (2006.01)
(52) U.S. Cl. ............... 216/56; 216/87; 210/500.22; 210/500.27
(58) Field of Classification Search ............ 216/56, 216/57, 87, 91, 94
See application file for complete search history.

(56) References Cited

U.S. PATENT DOCUMENTS

| | | | |
|---|---|---|---|
| 3,677,844 A * | 7/1972 | Fleischer et al. ............ 216/53 |
| 3,852,134 A | 12/1974 | Bean | |
| 5,449,917 A | 9/1995 | Clements | |
| 6,270,671 B1 * | 8/2001 | Shorr et al. ............ 210/637 |
| 2004/0246657 A1 | 12/2004 | Norton | |
| 2005/0049320 A1 | 3/2005 | Yoshida et al. | |
| 2005/0173330 A1 * | 8/2005 | Osenar et al. ......... 210/321.75 |

FOREIGN PATENT DOCUMENTS

| | | | |
|---|---|---|---|
| EP | 0050168 | | 4/1982 |
| JP | 03-038227 | * | 2/1991 |
| JP | 03-038228 | * | 2/1991 |
| JP | 03-38338 | | 2/1999 |
| RU | 2 233 196 | | 7/2004 |

OTHER PUBLICATIONS

E. U. Apel, "Measurements of the Diameter of Selectivity Etchable Tracks Produced in Polymer by Heavy Ions." The latter article appeared in Nuclear Tracks, vol. 6, Nos. 2-3, pp. 115-118, 1982.
Shirokova V. V., and Tretyakova S. P., "Physical And Chemical Basis For Manufacturing Of Fluoropolymer Track Membranes", Radiation Measurements, vol. 28, Nos. 1-6, 1997, pp. 791-798.

* cited by examiner

*Primary Examiner*—Allan Olsen
(74) *Attorney, Agent, or Firm*—Nixon Peabody LLP

(57) ABSTRACT

Porous track membranes are produced by exposing a polymeric film to a bombardment of heavy ions to provide the film with a track density, and etching pores into the resulting tracked film with an etching solution to provide the film with a density of the pores corresponding to the track density under conditions to maintain turbulent flow. An alkaline etching solution is used that contains salts of alkali metals in sufficient concentration to increase the boiling point of the resulting alkali-metal-containing solution to temperatures in excess of about 100 up to about 150° C.

23 Claims, 2 Drawing Sheets

PROCESS FOR PRODUCING A POROUS TRACK MEMBRANE

The present invention relates to a process for making porous track membranes useful for the separation of materials from fluids.

BACKGROUND OF THE INVENTION

A process for making porous track membranes is known in which a polymeric film is irradiated by heavy charged particles and chemically etched with a hexavalent chromium solution at a high temperature; see Russian Federation Patent No. 2056151, IPC B 01 D 67/00, Bulletin No. 8 of 20 Mar. 1996. This prior art process has many disadvantages. The chromium compounds are firmly adsorbed on the surface of polymeric film that results in making it considerably difficult to remove these compounds during the washing step. The subsequent presence of these compounds results in fouling of the filtered fluid when the membranes are used in the separation of materials from fluids.

Another prior art process for making porous track membranes comprises etching a tracked fluoropolymeric film with an etching solution containing potassium permanganate and sodium hydroxide at temperatures of 80-110° C. in a closed vessel; Shirokova V. V., and Tretyakova S. P., "Physical And Chemical Basis For Manufacturing Of Fluoropolymer Track Membranes", Radiation Measurements, Vol. 28, Nos. 1-6, 1997, pages 791-798. The disadvantages of this prior art process include: (1) the considerable increase in etching time by operating below 100° C. and the resulting poor efficiency and the non-uniform heating by not circulating the etching solution, and (2) the resulting variability of the etching rates at different points on the film surface.

There is a need for a more efficient process for producing higher quality porous track membranes.

SUMMARY OF THE INVENTION

The present invention provides porous track membranes by exposing a polymeric film to a bombardment of heavy ions to result in a film having a track density, and etching pores into the resulting tracked film with an etching solution to yield a film with a density of the pores corresponding to the track density under conditions to maintain laminar flow.

BRIEF DESCRIPTION OF THE DRAWINGS

Further features and advantages will become apparent from the following and more particular description of the preferred embodiments of the invention, as illustrated in the accompanying drawings in which.

DETAILED DESCRIPTION OF PREFERED EMBODIMENT OF THE PRESENT INVENTION

The following definitions are used herein:

A "fluid" is a gas or liquid that can range from air, water, blood, hydrocarbons, and other fluids that in their unprocessed state contain materials that are separated by systems using porous track membranes of the present invention.

A "porous membrane" is a thin pliable sheet or layer of a polymeric material containing pores to separate or filter out materials from fluids.

A "porous track membrane" is a tracked film chemically etched to produce pores of a specified diameter along the tracks.

A "tracked film" is a polymeric film exposed to a bombardment of heavy ions to produce tracks serving as etching sites to produce pores.

A "material" is anything that has a finite size ranging from about 0.01 to about 1.5 µm that can be separated from a fluid using a porous membrane having an appropriate pore diameter ranging from about 0.01 to about 1.5 µm.

Figure 1:
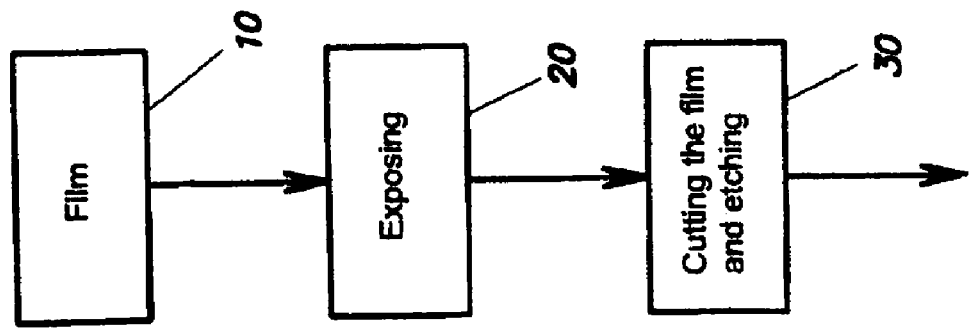
FIG. 1 is a simplified block flow diagram of one embodiment of the process of the present invention for producing porous track membranes.

FIG. 1 shows a block diagram of one embodiment of the process of the present invention in which a porous track membrane is produced that is useful in the separation or filtration of materials from a fluid.

Block 10 represents the step of acquiring a polymeric film usually acquired in continuous rolls of varying widths, typically about 600 millimeters (mm) in width, and thicknesses of typically about 10 µm. The process of the present invention is not limited to a specific type of polymeric film so long as the film is capable of being rendered porous. Typical examples of polymeric materials that have been found to be etched to a desired porosity include polyamides, fluoropolymers, polystyrene, polyacrylonitrile, cellulose acetate, polysulfone, and polyolefins, such as polypropylene, polyethylene, and copolymers thereof.

In the preferred embodiments of the present invention, the polymeric film is a fluoropolymeric film, and still more preferably a polyvinylidenefluoride (PVDF) film. While polyvinylidene fluoride (PVDF) film is preferred, other fluoropolymer films can be used including, but not limited to those of polychlorotrifluoroethylene (PCTFE), copolymers of chlorotrifluoroethylene with ethylene (ECTFE), polytetrafluoroethylene (PTFE), copolymers of tetrafluoroethylene and perfluoroalkoxyethylene (PFA), copolymers of tetrafluoroethylene and hexafluoropropylene (FEP), terpolymers of tetrafluoroethylene and hexafluoropropylene and perfluoroalkoxyethylene (EPE), copolymers of tetrafluoroethylene with ethylene (ETFE), polyvinyl fluoride (PVF), and any combinations of the these fluoropolymeric resins.

Block 20 represents the exposing step in which the polymeric film is bombarded by heavy ions to provide a film with a predetermined track density. Track density is the number of tracks per unit of area on the surface of the polymeric film as left by heavy ions, i.e., high-energy charged particles, traveling on a path of trajectory from a cyclotron or other particle accelerator. Each of the tracks left by these charged particles is capable of being acted upon by a suitable etchant.

Typical examples of suitable heavy ions for this purpose include but are not limited to ions of the following elements: argon, krypton, xenon, bismuth and a combination of these heavy ions. Preferably, the track density is in a range of about $10^7$ cm$^{-2}$ to about $10^9$ cm$^{-2}$. See U. S. Pat. No. 5,449,917 and Russian Federation Patent No. 2233196 published on 27 Jul. 2004, the relevant discussion of the exposing step is incorporated herein by reference. In addition see E. U. Apel, "Measurements of the Diameter of Selectively Etchable Tracks Produced in Polymer by Heavy Ions." The latter article appeared in Nuclear Tracks, Vol. 6, Nos. 2-3, pages 115-118, 1982.

The etching step of block 30 is the next step of the process of the present invention. In this step, the tracked film is placed in or passed through an etching solution to etch the film with pores that correspond to the track density. The etching step results in a polymeric film having a pore for substantially every track left by a charged particle on the surface of the film. In the resulting porous membrane there is a substantially one to one correspondence between the pore density of pores through the membrane and the track density of high energy particle tracks. A film having a width of about 600 mm, thickness of about 10 µm, and a length of about 1 to about 20 m with a track density of about 107 tracks per square centimeter, e.g., 107 $cm^{-2}$, results in a pore density of 107 $cm^{-2}$ with pores having a diameter of about 1 µm. Similarly, the same diameter of film with a track density of about 109 $cm^{-2}$ results in a pore density of 109 $cm^{-2}$ with pores having a diameter of about 0.01 µm. By varying the track density between these lower and upper ranges, the pore density can be controlled. By varying the etching time, the pore diameter can be controlled within a range of about 0.01 and about 1.5 µm. Preferably, an alkaline solution is used for etching if the polymeric film is made from a fluoropolymeric resin.

It has been demonstrated by experimentation that the preferred alkaline solution is an alkaline solution of potassium permanganate for etching PVDF films. The etching of PVDF film is preferably carried out at temperatures in a range of about 100 to about 150° C. One method for maintaining the alkaline solution greater than about 100° C., is to add salts of an alkali metal, preferably sodium chloride, in sufficient concentrations to achieve the desired rise in etching temperature.

Another variable in the etching step is to pass the alkaline solution in contact with the PVDF under conditions to maintain laminar flow. This is accomplished by circulating the etching solution over the PVDF film at a Reynolds Number in the range from about 100 to about 500. At such flow rates, the temperature gradient of the solution in contact with the film is substantially reduced to zero and the rate of etching is substantially uniform on all tracks of film surface. Accordingly, these flow rates result in a narrowing of the range of pore diameter distribution on the finished porous track membrane.

While the etching step is carried out for a period in a range of about 1 to about 24 hours, a shorter period of about 3 to 9 hours is recommended for an alkaline solution of potassium permanganate. The exact etching time depends on the required diameter of pores and the thickness of the film.

It has been found with longer etching periods that manganese dioxide is formed as a result of the etching reaction and is deposited on the film surface. The manganese dioxide deposition hinders the access of the etching solution to the reaction zone and results in reduced reaction velocity. By circulating the etching solution in the etching bath under laminar conditions as indicated above, the settling reaction products are at least partially washed off the film surface and the reaction velocity remains approximately constant during the entire etching step.

By controlling the process-conditions of temperature, flow rate and time as described above, it has been found that the etching step takes place without any substantial overheating. Etching without substantial overheating is defined as no overheating or if overheating of the etching solution does occur it is of not more than 1° C. These conditions can be expressed in the following equation:

$$N \leq Q \cdot C_s \cdot \Delta T$$

Where: N is power of the preheater, W;
Q is flow rate of the pickling solution, $m^3/s$;
$C_s$ is specific heat of the solution, $J/(m^3 \cdot K)$;
$\Delta T$ is overheating of the solution, K.

If $\Delta T$ is maintained at no higher than 1° C. or °K, $N \leq Q \cdot C_s$.

The intervals of time and temperature are determined by the following factors. Preferably the etching is not carried out at a temperature below 100° C. because the etching time increases considerably and results in low process efficiency. On the other hand, it is difficult to provide a temperature above 120° C. using the proposed method of addition an alkali salt. If the etching time is not more than about 1 hour, no pores are formed on the membrane. If the etching time is longer than the specified range of 24 hours, there is no further increase of any favorable effect. In addition, high porosity membranes will lose their mechanical properties upon being subjected to etching times outside the desired range.

The result of maintaining these optimum process conditions is a high quality of semi-permeable membranes, i.e. porous membranes. One of the characteristics of the porous track membranes produced by the process of the present invention is that the resulting porous membranes maintain the same maximum pore diameter throughout their useful life in a separation system, i.e., usually an average of about 6 months before the membranes must be replaced.

In the embodiment of the present process shown in FIG. 1, the tracked polymeric film is cut into a number of separate sections of a finite length prior to the etching step of block 30. By cutting the tracked film into manageable lengths, the etching step can be carried out in a batch type operation using an etching unit 200 shown in FIG. 2A. Lengths of the tracked film that are in the range of about 1 to about 20 m are preferred for cassette 210.

Figures 2A, 2B:
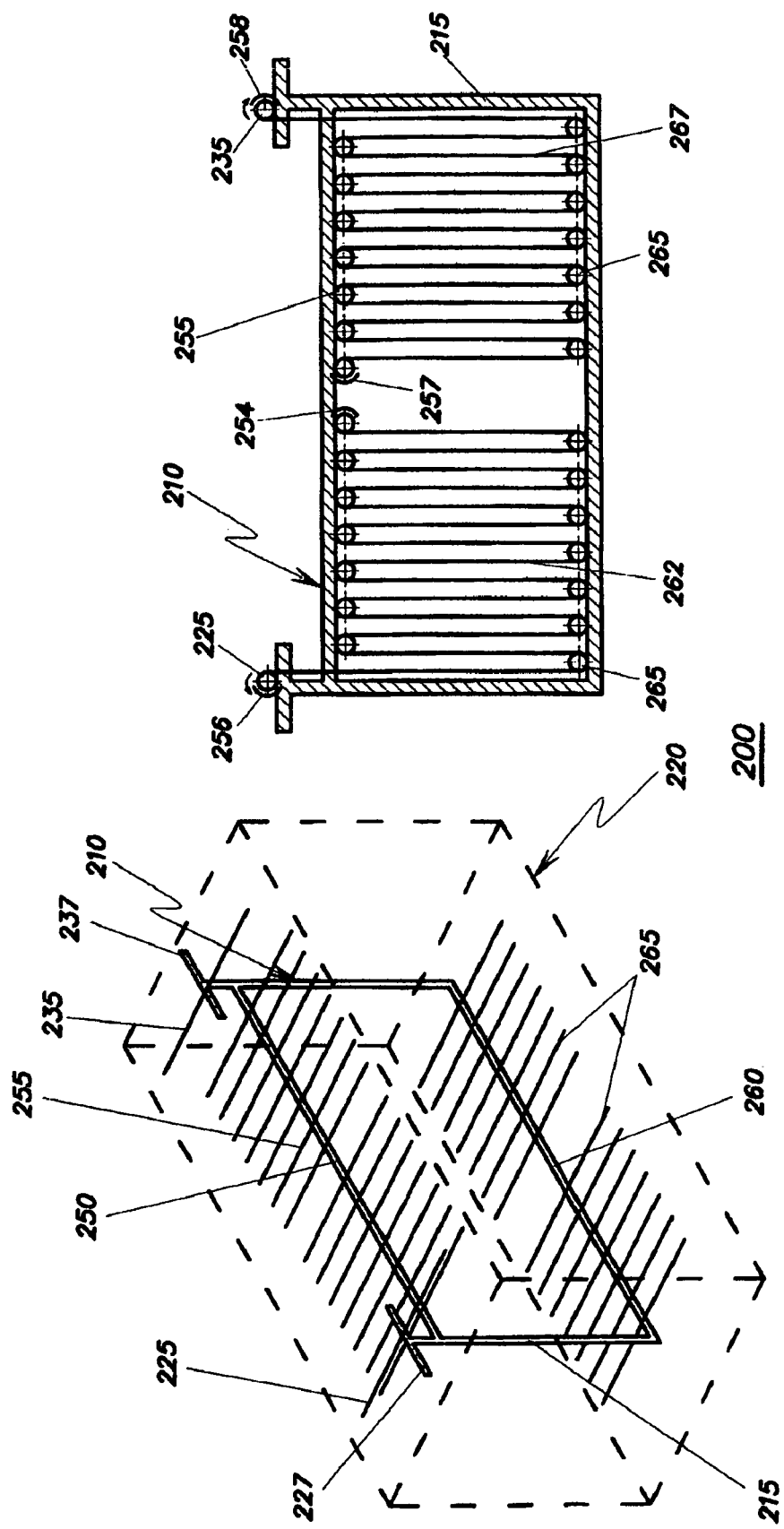
FIG. 2A is a left perspective view of a typical cassette and bath used for the etching step of cut strips of polymeric film of the process shown in FIG. 1.
FIG. 2B is a side cross-sectional view of the cassette shown in FIG. 2A.

FIGS. 2A and 2B show etching unit 200 including cassette 210 and bath 220 shown in phantom. Cassette 210 includes frame 215, first turning support 225 mounted on first lateral support 227 on frame 215, second turning support 235 mounted on second lateral support 237 on frame 215, and a number of equally spaced fixed upper horizontal supports 255 and lower horizontal supports 265. Frame 215 has upper member 250 upon which upper horizontal supports 255 are mounted and lower member 260 upon which the lower horizontal supports 265 are mounted.

During the film loading step of the etching operation, cassette 210 is removed from bath 220. A right end of a first length 262 of a polymeric tracked film is fixed on fixed upper horizontal support 255 by a first clip 254. The free left end of first length 262 is fed under a lower horizontal support 265 and then over an upper horizontal support 255 until the free left end is at turning support 225. The left end is then attached to turning support 225 by a second clip 256 to fix first section 262 of the film firmly in place on the supports. Similarly, a left end of a second length 267 of the film is fixed on a fixed upper horizontal support 255 by a third clip 257. The free right end of second length 267 is fed under a lower horizontal support 265 and then over an upper horizontal support 255 until the free end is at turning support 235. The right end is then attached to turning support 235 by a fourth clip 258 to fix second section 267 of the film firmly in place. Preferably all of the clips are made from titanium.

At this point in the etching step, turning supports 225 and 235 are rotated counterclockwise and clockwise, respectively to place first and second lengths 262 and 267 under a sufficient degree of preliminary or controlled stretching. The stretching compensates for the tendency for the film lengths to expand when they are placed in the etching bath at etching solution temperatures of not less than 100° C. Although only two lengths of film are shown fixed into position on the supports, up to four lengths can easily be accommodated by one cassette.

During the etching operation, etching solution is poured into bath 220 and cassette 210 is lowered into bath 220. Cassette 210 is raised and lowered to increase the etching reaction.

EXAMPLES

The following examples demonstrate the method of using etching unit 200. In each of the examples below, a solution, containing 20 mass % of KMnO4, 13 mass % of NaOH, and a salt of an alkali metal in the concentration from 200 g/l to achieve a concentration of complete saturation at the boiling temperature, was poured into etching bath 220. A pump and an electric heater were switched on and the etching solution was circulated as it was brought to the working temperature. When the solution reached the necessary temperature, cassette 210 containing the fluoropolymeric film that had been exposed to a bombardment of heavy charged particles, was immersed into bath 220 and was subjected to chemical etching for a period in the range of 3 to 9 hours. The heating of all surfaces of the tracked film was uniform as a result of the continuous circulation of the etching solution within the etching bath. As indicated above, the exact temperature and the time of etching varies for different types of film.

Example 1

A polyvinylidene fluoride film having a thickness of 13 μm thick and first exposed to a bombardment of accelerated Kr ions to have a track density of $1 \times 10^8$ cm$^{-2}$ was etched in an etching solution containing 20 mass % of KMnO4, 13 mass % of NaOH and 20 mass % of NaCl at 110° C. for 5 hours. The etching solution circulated inside. the etching bath at a flow rate of 1 m$^3$/h to provide NRe=200 for this example. The porous track membrane that was produced in this example had an effective pore diameter of 0.3 μm.

Example 2

For comparison, a similar example was performed in which the same tracked PVDF film was etched in a bath containing 20 mass % of KMnO4 and 13 mass % of NaOH at 100° C. for 6 hours to produce a porous track membrane with an effective pore diameter of 0.17 μm. This diameter was smaller by a factor of 1.8 as compared to the porous track membrane produced at temperatures above 100° C.

Example 3

Another PVDF film having a thickness of 25 μm thick and first exposed to a bombardment of accelerated Kr ions to have a track density of $5 \times 10^7$ cm$^{-2}$ was etched in an etching solution containing 20 mass % of KMnO4, 13 mass % of NaOH and 20 mass % of NaCl at 105° C. for 8 hours. The etching solution is circulated inside the etching bath at the same flow rate to provide the same NRe as Example 1. The porous track membrane that was produced in this example had an effective pore diameter of 0.4 μm.

Example 4

For comparison, a similar example was performed in which the same tracked PVDF film was etched in a bath containing 20 mass % of KMnO4 and 13 mass % of NaOH at 100° C. for 8 hours to produce a porous track membrane with an effective pore diameter of 0.1 μm. This diameter was smaller by a factor of 4 as compared to the porous track membrane produced at temperatures above 100° C.

Therefore, it has been found that by strictly controlling the temperature of the process above 100° C., the time to produce a given maximum pore diameter is one fourth that required when the temperature is maintained at 100° C.

Figure 3:
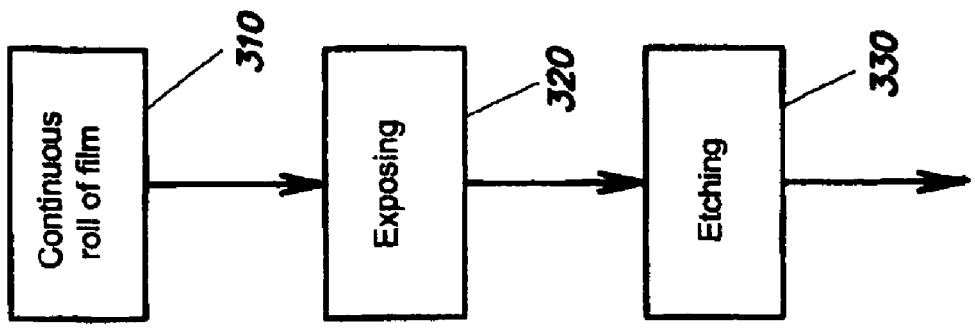
FIG. 3 is a simplified block flow diagram of another embodiment of the process of the present invention for producing porous track membranes.

FIG. 3 shows another embodiment of producing a porous track membrane in which a continuous roll of tracked polymeric film represented by block 310 is passed to block 320 for exposure to a bombardment of heavy ions as described above. From block 320 the continuous roll of tracked film is passed to block 330 to be subjected to a suitable etching solution as described above. However, in the case of a continuous roll, a continuous etching unit (not shown) is contemplated that includes introducing a fresh etching solution at the tracked film inlet end of the etching unit and removing a spent etching solution at the tracked film outlet end.

The applications for the porous track membrane produced by the various embodiments of the present invention include: (a) treatment, reclamation, recycling and reuse of industrial in-feed and wastewater; (b) desalination of sea water; (c) liquid separation for a wide variety of liquid industrial chemicals; and (d) membrane-based separation technology for the removal of sulfur and mercaptans from crude oil, natural gas, condensate and refined petroleum products.

Without departing from the spirit and scope of this invention, one of ordinary skill in the art can make various changes and modifications to each of the various embodiments of the present invention to adapt to various other applications. As such, these changes and modifications are properly, equitably, and intended to be, within the full range of equivalents of the following claims.

What is claimed is:

1. A process for producing a porous track membrane useful in the separation of materials from a fluid comprising the steps of:
   a) exposing a film of polyvinylidene fluoride to a bombardment of heavy ions to provide the film with a track density, wherein heavy ions are defined to have a mass greater than or equal to argon ions; and
   b) etching pores into the resulting tracked film with an etching solution at temperatures in a range of 100° to 150°C., said etching solution is an alkaline solution of potassium permanganate and containing at least one non-basic salt of alkali metals in sufficient concentration to increase the boiling point of the resulting alkali metal-containing solution, and circulating the etching solution over and in contact with the etching film at a flow rate to produce a Reynolds Number in the range from 100 to 500 to provide the film with a density of the pores corresponding to the track density.

2. The process of claim 1, wherein said heavy ions are selected from the group of ions consisting of krypton, argon, xenon, bismuth, and combinations thereof.

3. The process of claim 1, wherein said track density is in a range of about $10^7$ cm$^{-2}$ to about $10^9$ cm$^{-2}$.

4. The process of claim 1, wherein the diameter of said pores is in a range of about 0.01 to about 1 μm.

5. The process of claim 1 wherein said etching is carried out for a period in a range of about 1 to about 24 hours.

6. The process of claim 5, wherein at least the temperature, flow rate and time are controlled so that the etching step takes place under conditions expressed by the following equation:

$N \leq Q \cdot C_s \cdot \Delta T$, where N is power of a preheater, W; Q is flow rate of the etching solution, m³/s; Cs is specific heat of the solution, J/(m³·K); and ΔT is not more than 1 K.

7. The process of claim 6, wherein said alkali metal salt is sodium chloride.

8. A process for producing a porous track membrane useful in the separation of materials from a fluid comprising the steps of:
   a) exposing a film of polyvinylidene fluoride film to a bombardment of heavy ions to provide the film with a track density, wherein heavy ions are defined to have a mass greater than or equal to argon ions;
   b) cutting the resulting tracked film into a plurality of separate sections; and
   c) etching the sections of tracked film with an etching solution to provide the sections of film with a density of pores corresponding to the track density at temperatures in a range of 100° to 150° C., said etching solution is an alkaline solution of potassium permanganate and containing at least one non-basic salt of alkali metals in sufficient concentration to increase the boiling point of the resulting alkali-metal-containing solution, and under flow rate conditions to maintain a Reynolds Number in the range from 100 to 500.

9. The process of claim 8, wherein said heavy ions are selected from the group of ions consisting of krypton, argon, xenon, bismuth, and combinations thereof.

10. The process of claim 9, wherein said track density is in a range of $10^7$ cm$^{-2}$ to $10^9$ cm$^2$.

11. The process of claim 10, wherein the diameter of said pores is in a range of 0.01 to 1 μm.

12. The process of claim 8, wherein said etching is carried out for a period in a range of 1 to about 24 hours.

13. The process of claim 12, wherein at least the temperature, flow rate and time are controlled so that the etching step takes place under conditions expressed by the following equation:
$N \leq Q \cdot C_s \cdot \Delta T$, where N is power of a preheater, W; Q is flow rate of the etching solution, m³/s; Cs is specific heat of the solution, J/(m³·K); and ΔT is not more than 1 K.

14. The process of claim 13, wherein said alkali metal salt is sodium chloride.

15. The process of claim 8, wherein the section of cut tracked film is placed within a cassette to carry out step (c) by fixing one ending of the film on one of a plurality of fixed supports, extending the free end of the film around the remainder of the fixed supports, fixing the free end to a turning support, and turning the turning support to provide a preliminary stretching of the film before etching.

16. The process of claim 15, wherein the cassette is placed in the etching solution.

17. A process for producing a porous track membrane useful in the separation of materials from a fluid comprising the steps of:
   a) exposing a continuous roll of film of polyvinylidene fluoride film to a bombardment of heavy ions to provide the film with a track density; and
   b) etching the continuous roll of tracked film as the roll passes through an etching solution to provide the sections of film with a density of pores corresponding to the track density at temperatures in a range of 100° to 150° C., said etching solution is an alkaline solution of potassium permanganate and containing at least one non-basic salt of alkali metals in sufficient concentration to increase the boiling point of the resulting alkali-metal-containing solution, and under flow rate conditions to maintain a Reynolds Number in the range from 100 to 500.

18. The process of claim 17, wherein said heavy ions are selected from the group of ions consisting of krypton, argon, xenon, bismuth, and combinations thereof 19. The process of claim 18, wherein said track density is in a range of $l0^7$ cm$^{-2}$ to $10^9$ cm$^{-2}$.

20. The process of claim 19, wherein the diameter of said pores is in a range of 0.01 to 1 μm.

21. The process of claim 17, wherein said etching is carried out for a period in a range of 1 to 24 hours.

22. The process of claim 21, wherein at least the temperature, flow rate and time are controlled so that the etching step takes place under conditions expressed by the following equation:
$N \leq Q \cdot C_s \cdot \Delta T$, where N is power of a preheater, W; Q is flow rate of the etching solution, m³/s; Cs is specific heat of the solution, J/(m³·K); and ΔT is not more than 1 K.

23. The process of claim 22, wherein said alkali metal salt is sodium chloride.

* * * * *